Nov. 5, 1963　　　　G. L. PIERCE　　　　3,109,319
BACK GEAR CONTROL FOR LATHE DRIVE
Filed June 8, 1960　　　　　　　　　　6 Sheets-Sheet 1

INVENTOR
Gilbert L. Pierce

BY *Strauch, Nolan & Neale*

ATTORNEYS

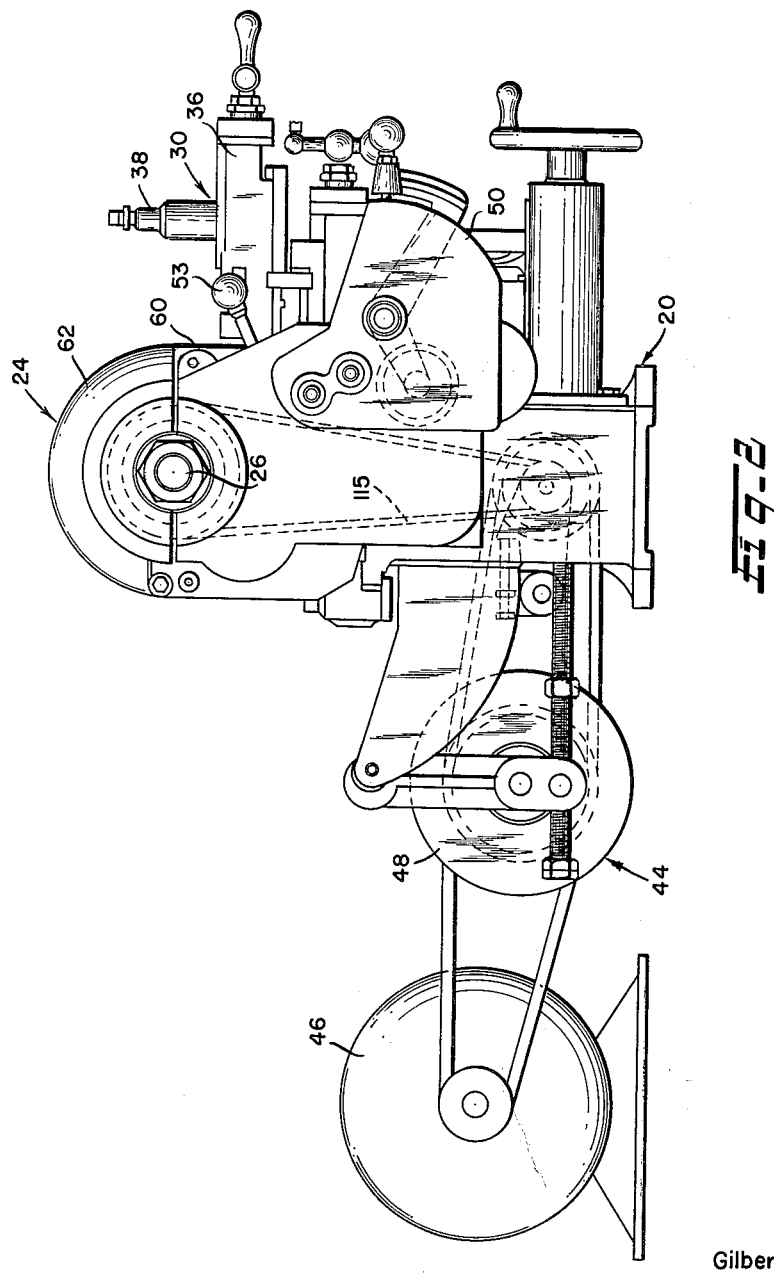

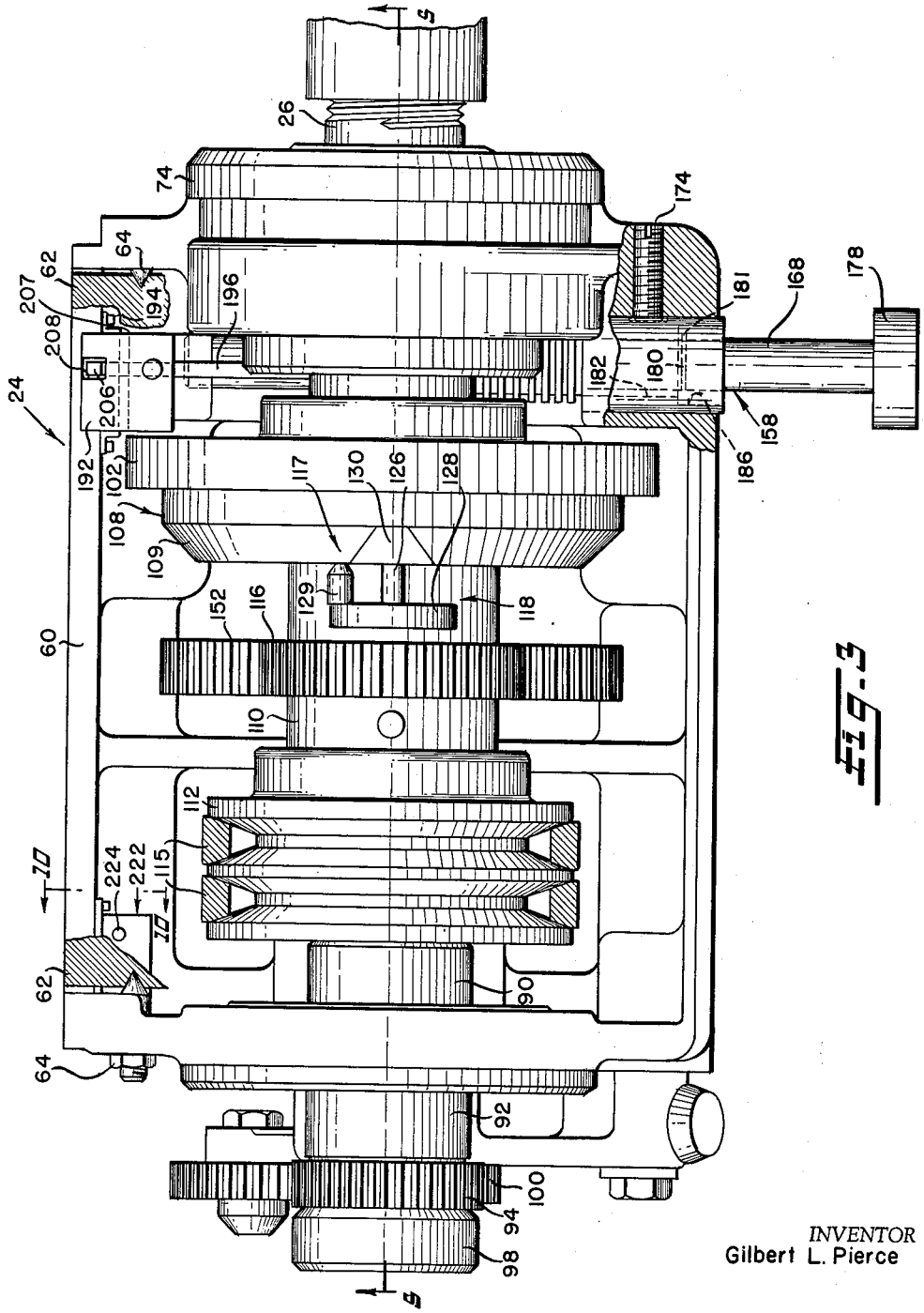

Nov. 5, 1963        G. L. PIERCE        3,109,319
BACK GEAR CONTROL FOR LATHE DRIVE
Filed June 8, 1960                6 Sheets-Sheet 4

INVENTOR
Gilbert L. Pierce

BY Strauch, Nolan & Neale

ATTORNEYS

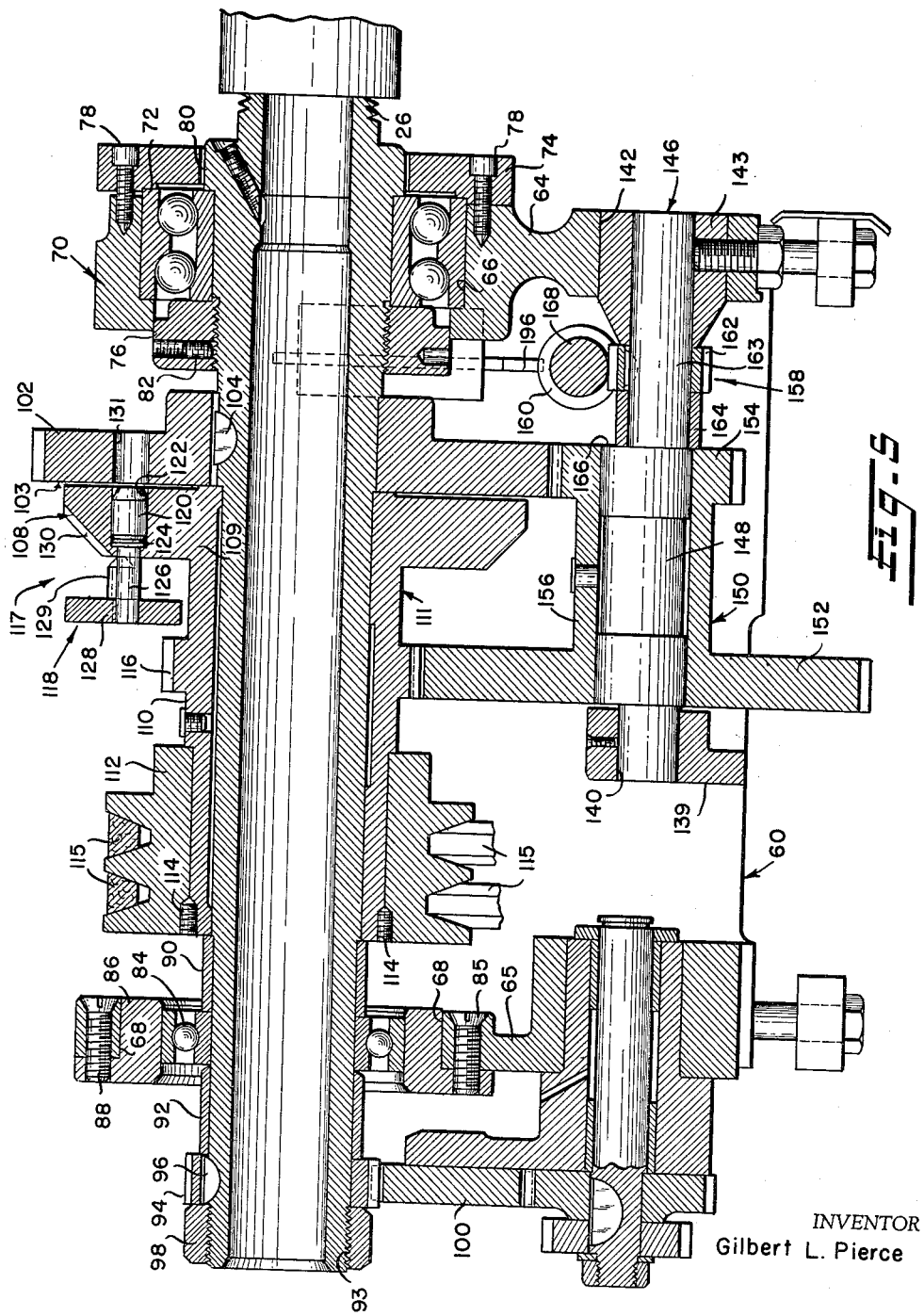

Nov. 5, 1963
G. L. PIERCE
3,109,319
BACK GEAR CONTROL FOR LATHE DRIVE
Filed June 8, 1960
6 Sheets-Sheet 6
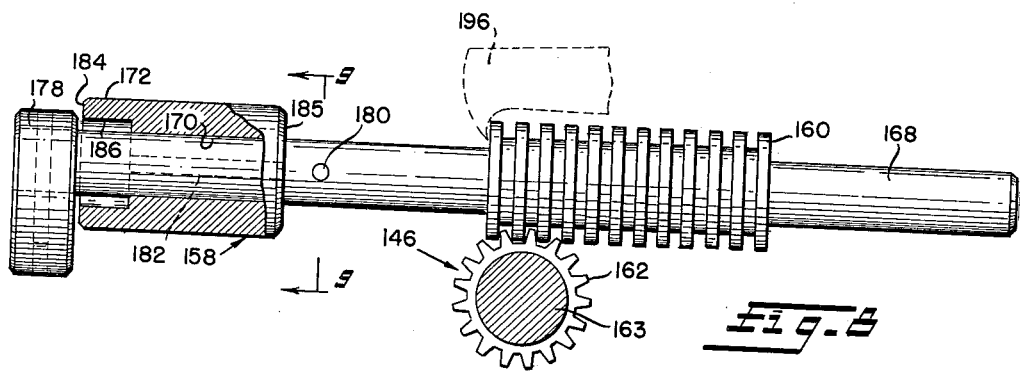
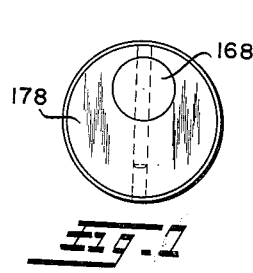
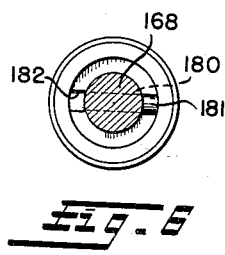
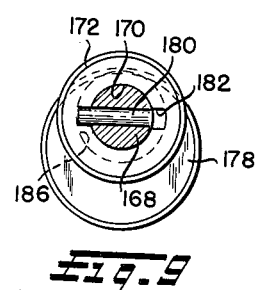
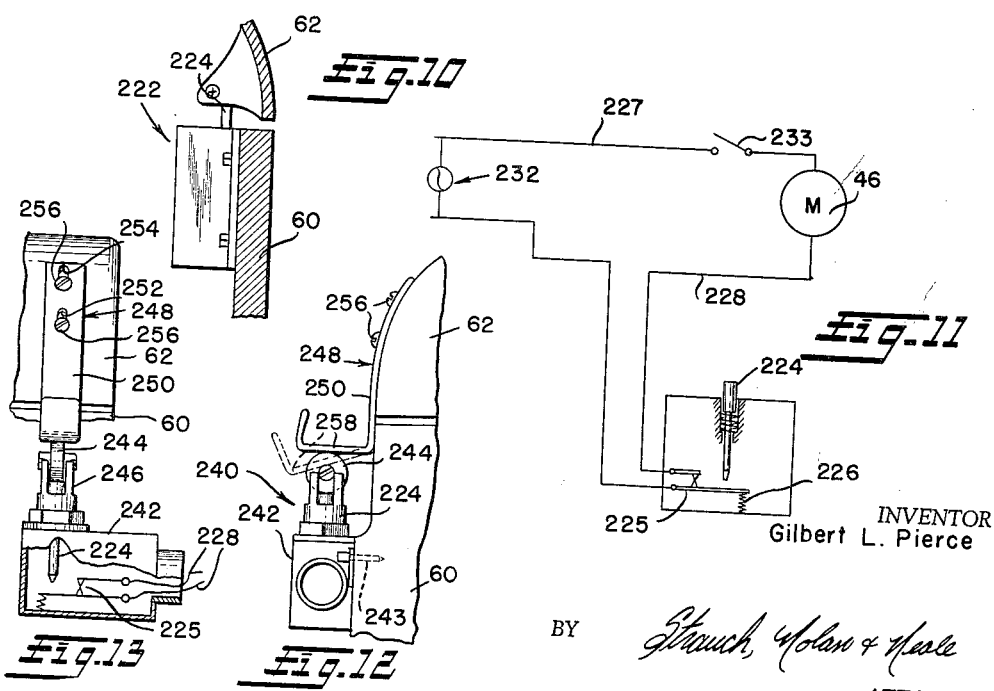
INVENTOR
Gilbert L. Pierce
BY *Strauch, Nolan & Neale*
ATTORNEYS

United States Patent Office 3,109,319
Patented Nov. 5, 1963

3,109,319
BACK GEAR CONTROL FOR LATHE DRIVE
Gilbert L. Pierce, Bellefontaine, Ohio, assignor to Rockwell Manufacturing Company, Pittsburgh, Pa., a corporation of Pennsylvania
Filed June 8, 1960, Ser. No. 34,827
23 Claims. (Cl. 74—472)

This invention relates to power transmission and more particularly to such mechanisms especially adapted for use with power driven tools such as lathes. The invention will be described and illustrated in connection with a metal cutting lathe to which it has particular application although it will be understood that it is not restricted to such usage.

Power transmissions for use in lathes take various forms, but one of the most satisfactory is the geared headstock transmission disclosed in United States Letters Patent No. 2,773,395 to Eric A. Reibig, issued December 11, 1956. It is toward headstock transmissions of this type that the instant invention is particularly directed.

In transmissions of the type disclosed by the above mentioned Reibig patent, there is provided a lathe headstock having a back gear drive together with a direct drive arranged to be operated alternately with the back gears for selectively varying the spindle speed through a suitable range to permit the utilization of the lathe with maximum effectiveness for working on different kinds of materials and for a wide variety of machine operations. With this prior art construction, the back gears are manually disengaged from the power train supplying torque to directly rotate the spindle and the spindle is directly coupled to the spindle drive pulley driven by a motor or other suitable power source. When the back gears and the direct drive are both in engagement, the spindle will not turn, being driven by two different drive ratios. With these prior devices as disclosed in the Reibig patent, engagement and disengagement of the back gears can be accomplished while the lathe is still running and power is being delivered to the spindle. Furthermore, a manually manipulatable lever is usually provided with these prior devices with which the engagement and disengagement of the back gears is facilitated. Due to the convenient and accessible operating position of this lever, it can be easily accidentally or forgetfully manipulated by an inattentive or unskilled operator to change the position of the back gears while the machine is under power. It will be appreciated that this results in clashing of the back gears with the gears of the spindle with resultant damage to the gears and other component parts of the transmission unit housed in the headstock. Frequently, inexperienced operators or curious unskilled bystanders will engage or disengage the back gears while the lathe is under power without having knowledge of the damage that can be caused by changing the position of the back gears.

It, accordingly, is a primary object of the present invention to provide an improved power transmission assembly particularly adapted for lathes and the like which is operable to selectively establish a number of drive spindle speeds alternately through a back gear or direct drive arrangement by the manipulation of an externally accessible manually manipulatable control member and which is characterized by the provision of novel means for minimizing and substantially precluding the possibility of an inattentive or inexperienced operator or a curious unskilled bystander from engaging or disengaging the back gears of the power transmission while the lathe is under power. A more specific object of the present invention is to provide an improved power transmission assembly particularly adapted for lathes including novel control means which may be selectively operated to drive the spindle at one or more speeds wherein a manually manipulatable control member is axially shiftable between gear engaging and disengaging position and requires rotation thereof to a predetermined angular position before effective axial displacement of the control member can be manually accomplished for the purpose of engaging or disengaging the back gears of the power transmission.

A further specific object of the present invention is to provide a novel locking mechanism for a manually manipulatable member which is operable only when released by the locking mechanism to engage and disengage the back gears in a lathe headstock and which is held in an inoperable locked position by the locking mechanism whenever the cover for the headstock housing is closed.

A further object of the present invention is to provide a power transmission assembly enclosed by a housing having a cover wherein power supplied to the transmission is interrupted whenever the cover is opened.

A more specific object of the present invention is to provide an improved machine tool power transmission having a direct drive and a back gear drive wherein a novel control mechanism is operable to selectively establish and dis-establish the back gear drive and has a rotatably manually manipulatable shaft mounted for axial movement between control positions corresponding to engagement and disengagement of the back gear drive, a slotted bore formed in a journal sleeve supporting one end of the shaft, a pin fixed in the shaft with a portion protruding beyond the outer periphery of the shaft and adapted to be slidably received in the slot of the bore, and a knob eccentrically mounted on the outer end of the shaft and arranged so that when it is released by the operator, the eccentric mass thereof swings the pin out of alignment with the sleeve slot whereby the shaft must first be rotated to align the pin with the slot before the portion of the shaft containing the pin can be axially moved through the sleeve.

Further objects and advantages will become apparent as the description proceeds in connection with the accompanying drawings wherein:

FIGURE 2 is a left-hand or headstock end elevation of the lathe shown in FIGURE 1;

FIGURE 3 is a top plan view of the headstock of FIGURES 1 and 2 with the top cover member substantially broken away to show interior details;

FIGURE 4 is a right-hand or chuck plate end elevation of the headstock shown in FIGURE 3 with the headstock housing partially broken away to show details of construction and showing the back gear assembly in engagement and the direct drive out of engagement with the spindle drive gear;

FIGURE 5 is a longitudinal central vertical sectional view of the headstock of FIGURE 3;

FIGURE 6 is a fragmentary sectional view taken along the lines 6—6 of FIGURE 4;

FIGURE 7 is a fragentary elevational view taken along lines 7—7 of FIGURE 4;

FIGURE 8 is a longitudinal elevational view of the back gear control shown in FIGURE 4 with parts broken away to show details of contruction and showing the component parts of the control positioned for disengagement of the headstock back gears;

FIGURE 9 is a sectional view taken along lines 9—9 of FIGURE 8;

FIGURE 10 is a fragmentary sectional view taken along the lines 10—10 of FIGURE 3;

FIGURE 11 is an electrical diagrammatic view illustrating the electrical circuit for the electrical interlock mechanism shown in FIGURE 3;

FIGURE 12 is a fragmentary left-hand or headstock end elevation of a lathe according to a further embodiment of the present invention;

FIGURE 13 is a sectional view taken along lines 13—13 of FIGURE 12;

FIGURE 14 is a fragmentary sectional view similar to FIGURE 4 and showing a further embodiment of the locking mechanism for the back gear control shifting shaft.

Figure 1:
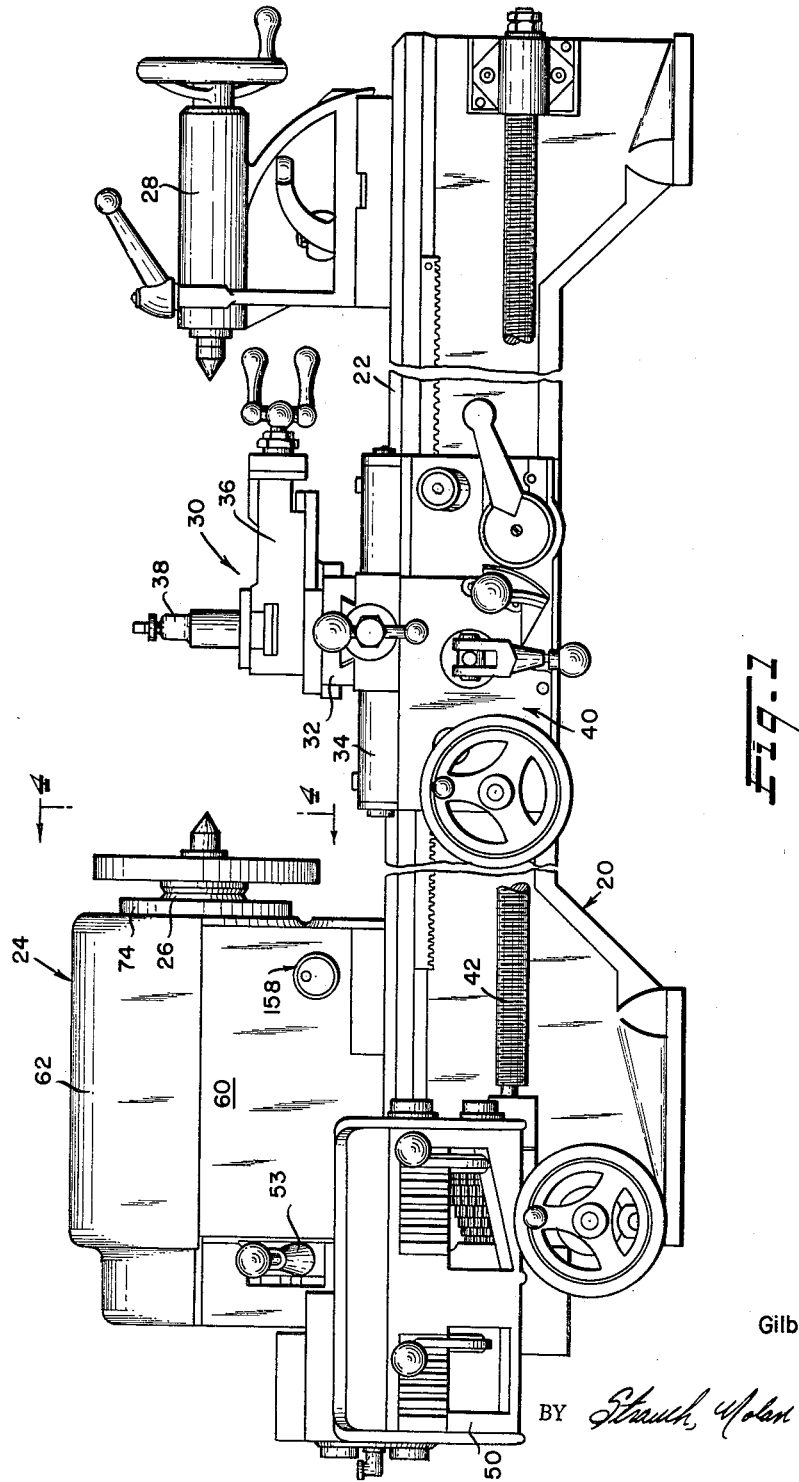
FIGURE 1 is a front elevational view showing a metal cutting lathe according to a preferred embodiment of the present invention.

Referring now to the drawings and more particularly to FIGURES 1 and 2, the principal components of the lathe assembly there shown are the lathe bed 20 adapted to be fixedly mounted on a bench or frame (not shown) and having longitudinal ways 22, a lathe headstock 24 mounted at one end of the lathe bed and including a hollow lathe headstock spindle 26 adapted to mount a work piece (not shown), a tailstock 28 of conventional construction mounted at the opposite end of the lathe bed in the usual manner, and a tool carriage 30 slidably supported on longitudinal ways 22 of lathe bed 20. Tool carriage 30 includes a cross slide 32 slidably mounted on a saddle 34 for transverse cross feed movement, a compound rest 36 mounted on cross slide 32 in the usual manner, a tool post 38 conventionally mounted on compound rest 36 and adapted to hold a tool (not shown) for working engagement with the work piece held by spindle 26, and an apron structure 40 extending downwardly in front of lathe bed 20 and which includes the longitudinal and cross feed drives for powering carriage 30. Driving power to the apron longitudinal and cross feed drives is transmitted through a lead screw 42.

Driving power for headstock spindle 26 and lead screw 42 is provided for by a multiple speed drive train 44 (FIGURE 2) made up of a single speed electric motor 46, an infinitely variable speed pulley drive assembly 48 operative to drivingly connect motor 46 to spindle 26 at selectively variable speeds, a quick change speed gear box transmission unit 50 drivingly connected to lead screw 42, and a stop and reverse feed mechanism 53 drivingly connecting spindle 26 to the input of gear box transmission unit 50 for stopping and reversing the feed of carriage 30.

Of the above components, the present invention is primarily concerned with the spindle driving mechanism including the power transmission mechanism housed in the headstock 24. For a more detailed description of the other components of the lathe, reference is made to my copending application, Serial No. 11,544 filed February 29, 1960, and entitled "Improvement in Lathe Drive Trains."

With continuing reference to the drawings and more particularly to FIGURES 1–4, headstock 24 is shown to comprise a heavy hollow casting 60 which forms the main portion of the headstock body and which houses and supports the principal components of the spindle power transmission assembly. A top cover 62 is hinged to headstock body casting 60 as by coaxially opposed cone tipped set screws 64 (FIGURE 3) threadedly secured in casting 60 and engaging in spot bores formed in opposed ends of the cover so the cover is pivotable about the axis of the set screws. Cover 62 encloses and protects the transmission assembly housed in headstock 24 and provides ready access thereto for inspection, repair and for other purposes as will presently become apparent.

Referring now to FIGURE 5, it will be seen that casting 60 is provided in its opposite end walls 64 and 65, respectively, with aligned machine bores 66 and 68, the former being a stepped bore formed in a boss 70 of substantial thickness. Received within bore 66 is a double row ball bearing 72, the inner race of which supports the front end of a spindle 26 and is clamped thereto between an annular shoulder 80 on spindle 26 and a collar nut 76. The outer bearing race is disposed in bore 66 between a retainer ring 74 attached to the forward end of the housing as by countersunk machine screws or bolts 78 and the shoulder formed by stepped bore 66. As a consequence, spindle 26 is held against axial movement.

Spindle 26 is supported at its opposite end in a single row ball bearing assembly 84 which is axially slidably received within a bearing retainer 86 held in place within bore 68 as by countersunk screws 88. Bearing 84 is axially confined on spindle 26 between an annular spacer 90 and an annular spacer 92 which are clamped in place relative to spindle 26 as will presently appear.

As will be clear from FIGURE 5, the outer or peripheral surface of spindle 26 varies in diameter throughout its length from shoulder 80 toward its opposite end to provide a series of support lands separated by respective axially facing abutment shoulders and terminates at its opposite end in a threaded terminal portion 93. One end of spacer 90 abuts the leftmost abutment shoulder of spindle 26 and the inner end race of bearing 84 and spacer 92 are clamped between the other end of spacer 90 and a headstock transmission output gear 94 which is non-rotatably mounted on spindle 26 by means of a key 96 and is held in place against spacer 92 by a collar nut 98 threaded onto the end 93 of spindle 26. Gear 94 meshes with a gear 100 which forms a portion of the tool feed gear train more fully described in said copending application Serial No. 11,544.

At a point axially adjacent collar nut 76, a large spindle bull gear 102 having a planar end face 103 is non-rotatably mounted on spindle 26 by means of a key 104. Opposing face 103 of gear 102 is a clutch flange 108 having a flat end face 109 and formed on an elongated hub extension 110 of input shaft 111. Hub extension 110 extends axially away from flange 108 and abuttingly contacts spacer 90 at the end remote from the inner race of bearing 84. Shaft 111 and its clutch flange 108 are rotatably mounted on spindle 26 between the flat face of gear 102 and spacer 90. Hub extension 110 adjacent to spacer 90 mounts a V-belt drive pulley pair 112 which is non-rotatably and coaxially fixed to hub extension 110 by means of set screws 114. Pulley pair 112 is drive connected to the output of variable speed pulley assembly 48 by means of a pair of V-belts 115. Formed integrally on hub 110 between clutch flange 108 and pulley 112 is the input spindle gear wheel portion 116.

Pulley pair 112 and spindle gear 102 are adapted to be selectively drivingly connected either directly by means of a clutch pin assembly indicated at 117 or indirectly through the transmission back gears to be presently described. Clutch pin assembly 117 comprises a clutch pin 118 which has an enlarged head 120 freely slidably mounted in the larger diametered portion of a stepped bore 122 formed in flange 108 along an axis paralleling the spindle axis. Enlarged head 120 is biased outwardly beyond the forward planar end face 109 of flange 108 by means of a spring 124 received within the larger bore portion of bore 122 in surrounding relationship to the smaller diametered shank portion 126 of pin 118. The shank portion 126 of pin 118 extends beyond the opposite planar end face of flange 108 and is pin secured to a manually manipulatable control knob 128. Control knob 128 adjacent its periphery carries a spacer pin 129 adapted to abut flange 108 and lock clutch pin 118 in its noncoupling position within bore 122 or to lie in notch 130 of flange 108 when the direct driving coupling connection of pin 118 and gear 102 is desired. By this structure, head 120 of pin 118 can be axially withdrawn into bore 122 by manually retracting knob 128 against the bias of spring 124.

Spindle gear 102 is formed with a through bore 131 radially offset from spindle 26 and adapted to register with bore 122 upon relative rotation of shaft 111 and gear 102. When bore 131 is in registry with bore 122 and knob 128 is released, the bias of spring 124 urges the head 120 of pin 118 partially into bore 131 thereby rotatably coupling flange 108 to gear 102 and establishing a direct driving connection between pulley pair 112 and gear 102.

With continued reference to FIGURE 5, it will be seen that the headstock body casting 60 is provided with a partition 139 spaced from end wall 64 and respective aligned machine bores 140 and 142, the axes of which are aligned below and parallel to the axis of spindle 26. Non-rotatably received in bore 142 is a bushing 143 of bearing material. Journalled in bushing 143 and in bore 140 is a back gear shaft 146 having an enlarged eccentric portion 148 intermediate its journalled ends. Rotatably mounted on shaft eccentric portion 148 is a back gear assembly 150 having a large gear 152 positioned to engage with gear wheel portion 116 and a small gear 154 positioned axially along elongated hub portion 156 to the right of large gear 152, to engage with spindle gear 102. Due to this eccentric shaft construction, it will be appreciated that rotation of shaft 146 arcingly swings gears 152 and 154 concomitantly radially into and out of engagement with respective gears 116 and 102 on spindle 26.

As shown in FIGURE 5, back gears 152 and 154 are both positioned for transmitting power to spindle 26 and with clutch pin 120 carried by knob 128 in its disengaged position so that power is transmitted to spindle 126 through back gears 152 and 154 instead of directly to spindle 26 through clutch flange 108. Although damage could result from accidental driving connection of either of these separate drives while the other is actually driving the lathe, the clutch pin 118 and back gear drive may desirably be connected simultaneously when the lathe power is cut off to lock the spindle against rotation so that the face plate can be removed, a workpiece can be drivingly connected to the face plate, or the clamp nut 98 can be loosened to enable the spindle itself to be removed. If both drive connections are engaged and power is turned on belt slippage will occur due to the locked condition of spindle 26, but no damage would normally result.

To drive spindle 26 directly, back gears 152 and 154 are disengaged from spindle gears 116 and 102 respectively by rotating shaft 146 in a clockwise direction as viewed from FIGURE 4 and clutch pin 118 is released to enter bore 131 of gear 102. In this position then power is transmitted to rotate spindle 26 through pulley pair 112, clutch flange 108, pin 118 and gear 102 which is keyed to spindle 26.

To change speed ranges, power delivery to pulley pair 112 is interrupted, pin 118 is manually moved out of engagement with bore 131 of gear 102 and locked out by manipulation of control knob 128, and back gears 152 and 154 are swung into engagement with gears 116 and 102 respectively by rotating shaft 146 in a counterclockwise direction as viewed in FIGURE 4.

In accord with the present invention, shaft 146 is rotated by means of a control mechanism 158 which comprises, as best shown in FIGURES 4 and 5, a rack segment 160 providing simple separate annular teeth in constant friction free or loose meshing engagement with a pinion gear 162 fixedly keyed to the small diametered portion 163 of shaft 146 and axially retained in position thereon between an annular spacer 164 abutting a shoulder 166 formed between eccentric portion 163 and the inner end face of bushing 143. With continuing reference to FIGURE 4, rack segment 160 is non-rotatably fixed or integrally formed on a stud shaft 168 which has a longitudinal axis that extends normally to a vertical plane containing the axis of spindle 26 and which is rotatably mounted for axial sliding movement at its right-hand end in a bore 169 formed in an enlarged boss 170 of headstock casting 60. At its opposite end, stud shaft 168 extends through and is journalled for rotation and axial sliding movement in the smaller diametered portion of a stepped bore 170 of a journal sleeve 172. Sleeve 172 is fixedly retained in a bore 173 formed in an opposed boss of headstock casting 60 coaxially related to boss 170 as by a set screw 174 which abuttingly engages a flat 176 (FIGURE 4) formed on the outer periphery of sleeve 172.

With reference now to FIGURES 1, 3 and 4, shaft 168 protrudes beyond the front wall of headstock casting 60 and fixedly carries a cylindrical operating knob 178 which is eccentrically disposed on the forward protruding end of shaft 168 for a purpose as will become apparent. Thus, by means of this structure, axial displacement of shaft 168 in opposite directions by pull and push manipulation of knob 178 effectively rotates eccentric shaft 146 to cause back gears 152 and 154 to swing into and out of meshing engagement with spindle gears 116 and 102 respectively.

To minimize the chances of the operator forgetfully or inattentively engaging and disengaging the back gear assembly 150 while the lathe is under power, a roll pin 180 is fixedly received in a cross bore formed in stud shaft 168 along an axis that is angularly offset relative to a transverse plane containing the centers of both knob 178 and shaft 168 by a magnitude of 90° as best shown in FIGURES 6 and 7. Pin 180 has an end 181 protruding beyond the periphery of shaft 168 at one side thereof and is adapted to slidably engage in a longitudinal through slot 182 (FIGURES 3, 6 and 8) formed in the inner periphery of sleeve 172. As shown in FIGURE 8, shaft 168 is axially displaced to its inward position with the inner end face of knob 178 closely adjacent to the exposed end face 184 of sleeve 172 and with pin 180 positioned to the rear of sleeve 172 between the inward planar face 185 of sleeve 172 and shaft 146. In this position of shaft 168, back gear assembly 150 is disengaged from spindle gears 102 and 116 and eccentric portion 148 of shaft 146 depends between the journalled shaft ends relieving rack segment 160 of all pressure forces. When knob 178 is released by the operator, the knob 178 and shaft 168 rotate by virtue of the eccentric mass of knob 178 to a rest position where the center of the knob is vertically below the center of shaft 168. In this released position of knob 178, the protruding end portion of pin 180, which is fixed relative to knob 178, is diametrically opposite from slot 182.

By this construction, it will be appreciated that in order to axially displace shaft 168 to its outward position wherein back gear assembly 150 engages with spindle gears 102 and 116, knob 178 must initially be rotated through an arc of 180° until pin 180 aligns with slot 182 before it can be manually pulled out or retracted.

In the position shown in FIGURE 4, shaft 168 is pulled out to its forward position where back gear assembly 150 engages with gears 116 and 102 and knob 178 has rotated into a position where pin end 181 is out of alignment with a slot 182 and its eccentric mass depends vertically below the rotational axis of shaft 168.

It is apparent that upon releasing knob 178, gravity and machine vibrations of back gear assembly 150 cooperate to rotate shaft 168 to the position where the eccentric center of knob 178 is depending vertically below the shaft axis to maintain misalignment of pin end 181 and slot 182. This automatic position maintenance of knob 178 and shaft 168 to assure misalignment of pin end 181 and slot 182, effectively prevents axial movement of shaft 168 between positions corresponding to engagement and disengagement of back gear assembly 150 until knob 178 is positively operated. By this structure, it will be appreciated that accidental bumping or idle curiosity on the part of unskilled attendants cannot change the position of back gearing assembly 150.

In accordance with the present invention, a locking mechanism 190, as best seen in FIGURE 4, also is provided to prevent axial movement of shaft 168 even after knob 178 is rotated to a position where pin 180 aligns with slot 182 unless headstock cover 62 is opened. The purpose of this feature is to insure that headstock cover 62 be intentionally opened and the power be cut off by the operator before attempting to engage back gear assembly 150.

With continuing reference to FIGURES 3 and 4, locking mechanism 190 is shown to comprise a mounting block 192 fastened by means of mounting screws 194 to the side wall of headstock casting 60. A pawl 196 is pivotally mounted on mounting block 192 by means of a pin 198 so as to rock about an axis extending parallel to the spindle axis and normally to the axis of shaft 168. The assembly is mounted on the rear wall of headstock casting 60 with pawl 196 aligned directly over the axis of shaft 168 and at a height that permits its forward gear engaging end to drop into its lower generally horizontal position where it is adapted to engage with the annular teeth of rack 160 on shaft 168 so as to lock and hold shaft 168 against axial movement. A spring 200 functioning to bias pawl 196 into engagement with rack 160 is preferably mounted in a vertical bore 202 formed inwardly of the recessed bottom end face 204 of mounting block 192 between pivot pin 198 and the forward gear engaging end of pawl 196. By this construction, spring 200 reacts between the bottom wall of bore 202 to urge pawl 196 about pivot pin 198 in a counterclockwise direction, as viewed from FIGURE 4, into locking engagement with rack 160.

In order to pivot pawl 196 against the bias of spring 200 and out of locking engagement with rack 160, a square pin 206 is slidably mounted in a vertical slot 208 (FIGURE 3) formed inwardly of mounting block side face 207 which is opposite the inner surface of the right side wall of casting 60. Pin 206 extends downwardly beyond bottom face 204 of mounting block 192 in abutment with pawl 196 a spaced distance to the right of pivot 198 as viewed in FIGURE 4. With continuing reference to FIGURE 4, the upper end of pin 206 extends upwardly beyond the top of mounting block 192 and is adapted to be engaged by a surface 210 formed by a lug 212 which is preferably integrally formed on cover 62 and which extends rearwardly of the axis of rotation of the cover.

By this structure, it will be appreciated that when headstock cover 62 is swung open, surface 210 abuttingly engages the upper end of pin 206 to force pin 206 downwardly against the back end of pawl 196. This vertically downward movement of pin 206 rotates pawl 196 in a clockwise direction against the bias of spring 200 as viewed from FIGURE 4. Thus, opening of cover 62 will disengage pawl 196 from rack 160 thereby releasing shaft 168 for axial movement between positions corresponding to engagement and disengagement of back gear assembly 150. When shaft 168 is axially displaced to its inward position, the forward end of pawl 196 engages over the leftmost annular tooth of rack 160 as best shown in dotted lines in FIGURE 8 to prevent shaft 168 from being retracted. When shaft 168 is axially shifted to its retracted or forward position, the forward end of pawl 196 engages between the annular teeth of rack 160 as best shown in FIGURE 4.

In a further embodiment, as seen from FIGURE 14, the relative arrangement of spring 200 and pin 206 may be reversed by mounting spring 200 behind pivot 198 to bias the forward rack engaging end of pawl 196 away from rack 160 and by slidably mounting pin 206 in channel 215 formed in block 192' so that the bottom end of pin 206 abuttingly engages pawl 196 to the left of pivot 198. Lug 212 is extended as at 216 to abuttingly engage the upper end of pin 206 and to depress pin 206 when cover 62 is swung to its closed position. By means of this structure, spring 200 now functions to bias pawl 196 out of engagement with rack 160 and by closing cover 62, pin 206 rotates pawl in a counterclockwise direction into locking engagement with rack 160 against the bias of spring 200.

In order to insure that motor 46 is de-energized before the operator attempts to engage or disengage back gear assembly 150, an electrical interlock mechanism 220 is provided and comprises an interlock switch 222 mounted in the headstock on the rear wall of casting 60 near the set screw 64 opposite from the locking mechanism 190 as best shown in FIGURES 3 and 10. Switch 222 is of conventional construction and is provided with an upwardly biased actuating member 224 having a free end which engages with the inner surface of cover 62. As best shown in FIGURE 11, actuating member 224 is adapted to engage a set of switch contacts 225 which are normally biased closed by any suitable means such as spring 226. When cover 62 is lifted, actuating member 224 is depressed to open contacts 225 and when cover 62 is closed, member 224 is biased to its extended position where it allows contacts 225 to be closed by the force of spring 226.

With continued reference to FIGURE 11, a pair of electrical power conductors 227 and 228 are shown to electrically interconnect motor 46 with a suitable power source indicated at 232. Switch 222 is shown to be disposed in conductor 228 in series with the winding of motor 46 and source 232 so that it is operable when activated to interrupt delivery of electrical energy to the motor. A manual operating switch 233 of standard construction, and preferably of the magnetic type, is provided for energizing motor 46 and is disposed in conductor 227 in series with interlock switch 222.

Thus, by this construction, whenever cover 62 is lifted, power supplied to motor 46 is automatically interrupted in the event that the operator has forgotten to de-energize the motor before making any gear changes in the headstock. After completing any necessary operations requiring the headstock cover to be open, the operator must close cover 62 before motor 46 can be started up.

The additional rotational movement of knob 178 assists in making the operator more fully aware of the operation he is about to accomplish and insures against the possibility of accidentally or inadvertently shifting the back gears at a time when it would cause the components of the headstock transmission to be damaged.

In requiring headstock cover 62 to be opened before the back gear assembly 150 can be shifted, the operator is reminded of the fact that the direct drive pin control 117 must be reset whenever the back gears are shifted. The electrical interlock 222 insures against bodily injury to the operator by automatically stopping the rotation of the spindle 26 and pulley pair 112 whenever cover 62 is opened in contemplation of resetting the direct drive control 117.

Thus, it will be appreciated that the present invention is particularly useful for machine tools that are used in schools, home workshops and similar places where the operator is not likely to be highly skilled and may be careless in using a metal cutting lathe or similar machine tools.

It is now apparent that the manual control 158 requiring both a rotational and axial movement for shifting back gear assembly 150 together with locking mechanism 190 and electrical interlock 222 cooperate to provide for the safe operation of the headstock transmission and substantially precludes the possibility of an unskilled or inattentive operator shifting the back gear assembly while the lathe is under power. From the foregoing description, it will be appreciated that in order to operate the back gear shifter control 158, the operator must first open the headstock cover 62 to release lock mechanism 190 and that by opening the cover, the power transmitted for rotating spindle 26 is automatically interrupted. Then before attempting to axially displace the back gear control knob 178 for engaging or disengaging back gear assembly 150, the operator must first rotate the knob 178 through an arc of 180°. After the operator has reset the direct drive pin control 117 and moved back gear assembly 150 to a selected position, it is now necessary to close cover 62 before motor 46 can be energized. In closing cover 62, pawl 196 of locking mechanism 190 is lockingly engaged with rack 160 to prevent axial displacement of shaft 168.

In the past, it has been the custom of moderately fixed buyers in setting up machine tool workshops to purchase lathes with a minimum number of accessories to help keep the initial cost of the lathe at a minimum and at a later date to improve the equipment by adding various attachments. To this end, the present invention provides for a further electrical interlock mechanism 240, as shown in FIGURES 12 and 13, which can be readily and easily mounted as an attachment at any time after the lathe has been put into service. As will be explained, the operation of mechanism 242 is the same as that of mechanism 222 and is operable automatically to interrupt power supply to motor 46 whenever the cover 62 is lifted to opened position.

In accord with the present invention, interlock mechanism 240 comprises an interlock switch assembly 242 adapted to be mounted as by screws 243 on the exterior of the rear wall of casting 60 near the rearward end of the headstock immediately below cover 62 as best shown in FIGURE 12. The construction of switch 242 is the same as that of switch 222 shown in FIGURES 10 and 11 except that a roller 244 is journalled between the arms of a yoked end section 246 of the switch actuating member 224. Since identical reference numerals are used to identify identical elements of switches 222 and 242, no further description of switch 242 will be given.

With continuing reference to FIGURES 12 and 13, a rigid switch operating member 248 of preferable one-piece construction is adapted to be mounted on cover 62 for sliding engagement with roller 244.

As best shown in FIGURE 12, member 248 comprises an arcuate mounting section 250 curved to interfit the curvature of cover 62 and having apertures 252 and 254 through which suitable screws 256 extend for adjustably fixedly securing member 248 to cover 62. Extending generally radially outwardly from section 250 is a straight flat sided section 258 which abuttingly engages and rides on roller 244 so that when cover 62 is closed, section 258 extends substantially horizontally permitting plunger 224 to be displaced to its upper switch engaging position. When cover 62 is opened, section 258 is inclined downwardly and holds the actuating member 224 in depressed switch disengaging position as shown in dotted lines in FIGURE 12.

The contacts of switch 242 are serially connected to conductor 228 of the electrical circuit shown in FIGURE 11 so that when actuating member 224 is depressed by section 258, contacts 225 are opened thereby interrupting power supply to motor 46 and when member 224 is permitted to be displaced upwardly its spring biased contacts 225 are closed to complete a circuit through motor 46. Thus, movement of section 258 between its horizontal and inclined positions by respectively closing and opening cover 62, causes contacts 225 to respectively make and break.

By means of the foregoing switch structure, it will be appreciated that both the switch operating member 248 and disconnect switch 242 may be readily and easily mounted on a lathe already in service and may be made available to the lathe owner as an accessory kit that may be mounted as an attachment unit at any time, thereby providing for the additional safety feature of automatically interrupting the power supplied to motor 46 in the event that the operator has forgotten to de-energize the motor before making any gear changes in the headstock. After completing any necessary operations requiring the headstock cover to be opened, it will be appreciated that the operator must close cover 62 to return section 258 to its horizontal position permitting actuation member 224 to move upwardly thereby closing contacts 225 to allow completion of the electrical circuit through motor 46 when switch 233 is closed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine tool having motor means, a power transmission including an input power member driven by said motor means, a driven spindle and back gears and a transmission housing including a pivoted cover movable between open and closed positions: control means for selectively connecting and disconnecting said back gears to provide respective alternative speed ratio drive connections between said input power member and said driven spindle comprising a swingable back gear support structure; an axially shiftable member connected to said support structure and movable between back gear engaged and disengaged positions; locking means for preventing movement of said axially shiftable member when said cover is closed; and means actuated upon opening of said cover to interrupt operation of said motor means and release said locking means to thereby assure movement of said shiftable member only during inoperative periods of said motor means.

2. The machine tool of claim 1 wherein said locking means comprises a swingable arm having a finger portion movable in and out of engagement with said axially shiftable member and spring biased into engagement with said axially shiftable member, and said cover actuated means comprises plunger means engageable by said cover and adapted upon opening of said cover to abut said swingable arm and to move said swingable arm against the biasing force of said spring out of locking engagement with said axially shiftable member.

3. The machine tool of claim 1 wherein said cover actuated means comprises an electrical switch for opening and closing an electrical circuit and said motor means comprises an electrical motor having a power circuit including said electrical switch.

4. In a machine tool having a power input member and a rotatable spindle, means for transmitting power from said input member to drive said spindle at one of a plurality of predetermined speeds including at least one power train, and control means operable to selectively establish said power train from said input member: said control means comprising a manually manipulatable member, means mounting said manually manipulatable member for displacement between spaced apart control positions corresponding to engagement and disengagement of said power train whenever said manually manipulatable member is disposed in a predetermined operative position, and automatically operable means for displacing said manually manipulatable member to a rest position when released by the operator at its control positions to prevent engagement of said power train until displacement of said manually manipulatable member is effected to said predetermined position.

5. In a machine tool having a power input member, a rotatable spindle, means for transmitting power from said input member to drive said spindle including separate parallel drive trains independently operable to drive said spindle at different predetermined speeds: control means operable to selectively and separately establish said drive trains comprising a rotatable manually manipulatable member associated with one of said drive trains for controlling the operative connection between said input member, said spindle and said one drive train, said manipulatable member being mounted for axial displacement between control positions corresponding to engagement and disengagement of said one power train with said input member, and automatically operable means for rotating said manually manipulatable member when released to an inoperative rest position thereby assuring intentional actuation to a predetermined angular position before axial displacement of said manually manipulatable member from one control position to the other can be effectively accomplished.

6. In a machine tool having motor means, a power transmission including an input power member driven by said motor means, a driven spindle, a back gear train, a clutch member for directly engaging and disengaging said input power member and said driven spindle and a transmission housing including a pivoted cover movable between open and closed positions: back gear train control means for selectively connecting and disconnecting said back gear train to respectively connect and disconnect said input power member and said driven spindle through said back gear train comprising a swingable support structure for said back gear train, an axially shiftable member connected to said support structure movable between back gear train engaged and disengaged positions, locking means for preventing movement of said axially shiftable member when said cover is closed, and interlock means actuated upon opening of said cover to interrupt operation of said motor means and thereby assure movement of said shiftable member only during inoperative periods of said motor means; and clutch member control means operably accessible to an operator only when said cover is open to effect actuation of said clutch member.

7. A machine tool drive mechanism comprising a rotatably mounted spindle; a driven gear non-rotatably secured to said spindle; a first driving means adapted to drive said driven gear at a first speed; means for selectively drivingly connecting said first driving means with said driven gear; a second driving means adapted to drive said driven gear at a different speed; mounting means for supporting said second driving means and operable upon rotation thereof to move said second driving means into and out of engagement with said driven gear; and shifting means operable to selectively rotate said mounting means in opposite directions and comprising a manually manipulatable member drivingly connected to said mounting means and mounted for axial displacement between control positions corresponding to driving engagement and disengagement of said second driving means with said driven gear, automatically operable means for rotating said manually manipulatable member to a predetermined rest position whenever said manipulatable member is manually released in either of said control positions whereby rotation of said manipulatable member from its rest position to a predetermined angular position conditions said manipulatable member for axial displacement to said control positions.

8. In a machine tool having a rotatable spindle, a driving element rotatably mounted on said spindle and fixed against axial movement thereon, a first gear on said spindle mounted for rotation with said driving element, a second gear non-rotatably mounted on said spindle and fixed against axial movement thereon, means associated with said element and said second gear for establishing a driving connection therebetween, a gear train adapted to drivingly connect said first and second gears, and means associated with said gear train for selectively controlling the operative connection between said gear train, said driving element and said second gear comprising a rotatable shifting shaft mounted for axial displacement between axially spaced apart control positions corresponding to driving engagement and disengagement of said gear train with said first and second gears and operable upon axial displacement thereof to control the operative connection between said gear train, said driving element and said second gear, means for manually effectuating desired directional axial displacement of said shaft and being automatically operable when manually released in said control positions to rotate said shaft to a predetermined rest position, and means preventing axial engaging movement of said shaft from said predetermined rest position until rotation of said shaft is effected to a predetermined angular position.

9. The machine tool as defined in claim 8 wherein said means establishing a driving connection between said element and said second gear comprises a pair of axial bores formed one in said element and one in said second gear equidistant from said spindle axis in parallel relationship thereto, a pin mounted for sliding movement in one of said bores and spring biased toward the other of said bores, said pin being operable to be partially received in the other of said bores when said bores are revolved into alignment with each other, and manual means for axially withdrawing said pin from the other of said bores and for limiting the movement of said pin beyond said one bore.

10. The machine tool as defined in claim 9 wherein said manual means comprises a knob, and means rigid with said knob for retaining said pin in its withdrawn position.

11. A machine tool drive mechanism comprising: having a rotatable spindle mounted in a housing, a driving element rotatably mounted on said spindle and fixed against axial movement thereon, a gear non-rotatably mounted on said spindle, manually manipulatable drive means associated with said gear and said driving element for selectively establishing a driving connection therebetween, a rotatable back shaft, a gear train adapted to drivingly connect said element and said gear, means eccentrically mounting said gear train on said back shaft and means for rotating said back shaft to selectively drivingly connect said gear train, said element and said gear comprising: a rotatable shifting shaft mounted in said housing for axial sliding movement between control positions corresponding to driving engagement and disengagement of said gear train with said element and said gear, means drivingly connecting said shifting shaft and said back shaft and operable upon axial movement of said shifting shaft to rotate said back shaft, and means for mounting said shifting shaft for rotational and axial sliding movement including a journal sleeve having a bore therethrough and a longitudinally extending slot formed in the peripheral wall of said bore, said shifting shaft being rotatably and slidably received in said bore and having a free end protruding beyond said bore, a pin fixed in said shifting shaft and having a portion extending transversely beyond the outer periphery of said shifting shaft between said free end of said shifting shaft and said means drivingly connecting said shifting and back shafts and adapted to be slidably received in said slot for movement from one end of said bore to the other by axial displacement of said shaft, and manual means for first rotating said shaft to align said pin portion with said slot and thereafter effectuating axial shifting movement of said shifting shaft between positions corresponding to said control positions where said pin portion is positioned beyond said bore at one or the other ends thereof, said manual means being operative upon release thereof by the operator to automatically rotate said shifting shaft to a predetermined position where said pin portion is misaligned with said slot whenever said pin portion is positioned beyond said bore, and means providing an annular end face adjacent the free end of said shifting shaft.

12. The machine tool as defined in claim 11 wherein said means drivingly connecting said back shaft and said shifting shaft comprises a back gear fixed on said back shaft and a rack segment fixed on said shifting shaft in meshing engagement with said back gear and wherein a knob is eccentrically mounted on the free end of said shifting shaft protruding beyond said sleeve member, said rack segment being in loose engagement with said back gear to allow the eccentric mass of said knob to rotate said shaft to a predetermined rest position whenever said knob is manually released in one of said control positions whereby the eccentric center of said knob is rotated to depend vertically below the center of said shaft and contained in an axial vertical plane passing through the center of said knob, said pin portion being positioned to be angularly offset by a predetermined magnitude from said slot when the eccentric center of said knob is vertically below said shaft center whereby said knob swings said pin portion out of alignment with said slot whenever it is manually released in one of said control positions.

13. In combination, a mechanism for effectuating controlled movement of a shaft member between angularly spaced apart control positions comprising: a shifting shaft; means for drivingly connecting said shifting shaft with said shaft member and operable upon axial displacement of said shifting shaft in opposite directions to cause movement of said shaft member between said operating positions; means mounting said shifting shaft for axial sliding and rotational movement including a sleeve member having a bore which rotatably receives one end of said shifting shaft with a running fit and a longitudinally extending slot formed in the peripheral wall of said bore; a pin fixed in said shifting shaft and having a portion extending transversely beyond the outer periphery of said shifting shaft adjacent said one end of said shaft and adapted to be slidably received in said slot for movement from beyond one end of said bore to a point beyond the other bore end by axial displacement of said shifting shaft; and means for first manually rotating said shifting shaft to align said pin portion with said slot and thereafter effectuating axial shifting movement of said shifting shaft between positions corresponding to said control positions where said pin portion is positioned beyond said bore at one or the other ends thereof, said means being operative upon release thereof by the operator to automatically rotate said shaft to a predetermined rest position where said pin portion is misaligned with said slot whenever said pin portion is positioned beyond said bore.

14. The combination as defined in claim 13 wherein said one end of said shifting shaft has a portion protruding beyond said sleeve member on the opposite side of said sleeve member from said means drivingly interconnecting said shifting shaft with said shaft member, and said manual means comprises a knob eccentrically fixedly mounted on said protruding shaft portion, the eccentric mass of said knob being sufficiently great to cause rotation of said shifting shaft to a position where the eccentric center of said knob depends vertically below the center of said shaft whenever said knob is manually released and said pin portion is removed from said slot, the relative angular position of said pin portion, said slot and an axial plane containing the centers of said knob and said shaft in released position of said knob being such that said pin is misaligned with said slot thereby requiring rotation of said shaft to bring said pin portion into alignment with said slot to effectuate axial displacement of the portion of said shaft containing said pin through said bore.

15. The combination as defined in claim 14 wherein said slot and said pin are angularly offset in opposite directions from an axial vertical plane containing the centers of said knob and said shaft in released position of said knob by a magnitude of approximately 90 degrees, whereby said shaft must be rotated from a rest position through an angular distance of approximately 180 degrees to bring said pin portion into alignment with said slot.

16. The combination as defined in claim 13 wherein said shifting shaft extends normally to the rotational axis of said shaft member and said means for drivingly connecting said shifting shaft comprises a gear fixedly mounted on said shaft member and a rack segment fixed on said shifting shaft and having annular spaced apart teeth in continuous loose meshing engagement with said gear.

17. In a machine tool having a housing and a cover movably secured to said housing and providing access to the interior thereof in opened position, a spindle rotatably mounted in said housing, a driving element rotatably mounted on said spindle, means for selectively drivingly coupling said element to said spindle for driving said spindle in a first predetermined speed range, a rotatable back shaft, a gear train adapted to drivingly connect said element with said spindle to drive said spindle in a second predetermined speed range, means for mounting a portion of said drive train on said back shaft and operable upon rotation of said back shaft to establish and disestablish an operative driving connection through said gear train between said driving element and said spindle, manual means associated with said back shaft for selectively rotating said back shaft in opposite directions and locking means for rendering said manual means inoperative to rotate said back shaft whenever said cover is in a closed position.

18. In a machine tool having a housing, a rotatable spindle mounted in said housing; a spindle drive member operable to drive said spindle; a cover movably secured to said housing and providing access to the interior of said housing in open position; a power input member in said housing; a gear train adapted to drivingly connect said input member and said spindle drive member, control means for selectively drivingly coupling said input member to said spindle drive member through said gear train including a manually manipulatable member mounted for selective axial displacement between axially spaced apart control positions; and means for automatically locking said manually manipulatable member against axial displacement whenever said cover is moved to a closed position.

19. The machine tool as defined in claim 18 wherein said means for automatically locking said manually manipulatable member comprises means forming a toothed surface fixedly secured to said manually manipulatable member, a pawl pivotally mounted for swinging movement into and out of engagement with said toothed surface, spring means biasingly urging said pawl into engagement with said toothed surface, a rigid elongate member mounted for vertical sliding movement between said cover and said pawl, the ends of said elongate member abuttingly contacting said pawl and said cover and being operable to be displaced by opening movement of said cover to swing said pawl out of engagement with said toothed surface.

20. The machine tool as defined in claim 18, an electrical power source, motor means operable to deliver power to said input member, a circuit connecting said power source with said motor means for energizing said motor means, and an electrical interlock associated with said motor means to interrupt delivery of power to said input member whenever said cover is moved to an open position, said interlock comprising a switch having an actuating member and contacts in said circuit and operated by said actuating member, said actuating member being operable to be displaced by movement of said cover to make said contacts when said cover is closed and to break said contacts when said cover is opened.

21. The machine tool as defined in claim 20 wherein said switch is mounted on the exterior of said housing and a rigid member is secured to the exterior of said cover and operable to cause displacement of said actuating member upon movement of said cover between opened and closed positions to respectively make said contacts when said cover is closed and to break said contacts when said cover is opened.

22. The machine tool as defined in claim 21 wherein said switch bracket is provided with an arcuate section interfitting the curvature of the exterior of said cover and a straight portion extending generally radially away from said arcuate section and said cover, said straight portion being in continuous sliding engagement with a roller mounted on the free upper end of said actuating member and having a substantially horizontal position when said cover is in closed position and a downwardly inclined position when said cover is in opened position.

23. The machine tool of claim 1 wherein said locking means comprises a swingable arm having a finger portion movable in and out of locking engagement with said axially shiftable member and plunger means adapted upon closing of said cover to abut said swingable arm and hold said finger portion in locking engagement with said axially shiftable member, said means actuated upon opening said cover comprising spring means engaging with said swingable arm to bias said finger portion out of locking engagement with said axially shiftable member, said plunger means being operable when said cover is closed to hold said finger portion in locking engagement with said axially shiftable member against the bias of said spring means.

References Cited in the file of this patent
UNITED STATES PATENTS

| | | |
|---|---|---|
| 1,303,216 | Cone | May 6, 1919 |
| 2,556,740 | Polsen et al. | June 12, 1951 |
| 2,800,032 | Granberg | July 23, 1957 |
| 2,948,374 | Husband | Aug. 9, 1960 |